(12) United States Patent
Merlo (10) Patent No.: US 8,087,311 B2
(45) Date of Patent: Jan. 3, 2012

(54) REMOTE PIPE INSPECTION USING A MOUNTED CAMERA AND SENSOR

(76) Inventor: Stephen A. Merlo, St. Louis, MO (US)

( * ) Notice: Subject to any disclaimer, the term of this patent is extended or adjusted under 35 U.S.C. 154(b) by 977 days.

(21) Appl. No.: 12/039,552

(22) Filed: Feb. 28, 2008

(65) Prior Publication Data

US 2008/0210024 A1 Sep. 4, 2008

Related U.S. Application Data

(60) Provisional application No. 60/892,191, filed on Feb. 28, 2007.

(51) Int. Cl.
*G01N 33/00* (2006.01)
(52) U.S. Cl. ....................................... 73/865.8
(58) Field of Classification Search .................. 73/865.8; 348/82, 84
See application file for complete search history.

(56) References Cited

U.S. PATENT DOCUMENTS

| 5,956,077 | A * | 9/1999 | Qureshi et al. .................. 348/82 |
| 6,175,380 | B1 | 1/2001 | Van Den Bosch |
| 6,525,762 | B1 | 2/2003 | Mileski et al. |
| 6,823,239 | B2 | 11/2004 | Sieminski |
| 6,948,883 | B2 | 9/2005 | Osibamowo et al. |
| 2006/0290779 | A1 * | 12/2006 | Reverte et al. .................. 348/84 |
| 2009/0105969 | A1 * | 4/2009 | Saylor ............................. 702/47 |

OTHER PUBLICATIONS

Unknown, "LAMP: Lateral & Mainline Probe," available at http://www.cuesinc.com, printed on Oct. 29, 2008, 2 pages.
Stojanovic, Milica, "Underwater Wireless Communications: Current Achievements and Research Challenges," Massachusetts Institute of Technology, Sea Grant College Program, available at http://www.ieee.org/organizations/pubs/newsletters/oes/html/spring06/underwater.html, copyright 2006, printed on Oct. 20, 2008, 6 pages.

* cited by examiner

*Primary Examiner* — Hezron E Williams
*Assistant Examiner* — Nathaniel Kolb
(74) *Attorney, Agent, or Firm* — Stephen A. Merlo (57) ABSTRACT

Inspecting an interior portion of a pipe system. An imaging device includes a camera that is fixedly attached to an interior surface of a pipe. The camera captures a plurality of images of an interior portion of a pipe. The imaging device is connected to a data communication network and transmits data over the data communication network. The data includes image signals representative of the captured images. A computing device, also connected to the data communication network, receives the data transmitted over the data communication network by the imaging device. The computing device is remotely located with respect to the imaging device.

16 Claims, 4 Drawing Sheets

REMOTE PIPE INSPECTION USING A MOUNTED CAMERA AND SENSOR

BACKGROUND

Underground sanitary sewer pipe systems are designed to convey raw sewage, waste water, and the like by gravity flow to waste water treatment facilities where the sewage is processed and the waste water is treated for return to the environment. Municipalities' sanitary sewers are generally designed to carry only waste water and not ground or storm water. However, many sanitary sewer systems contain defects such as cracks, holes, and defective joints where lengths of pipe have shifted apart or where sealing material has become ineffective. As a result of these defects, undesired ground and/or storm water may enter the sanitary sewer system. Conversely, raw sewage may leak out of the sewer pipes (e.g., into the surrounding soil).

Typically, water enters a pipe system in one of two ways: infiltration or inflow. Infiltration occurs when ground water enters the sanitary sewer through a leak or other defect in a pipe. Inflow occurs when storm water is directed to the sanitary sewer through connections such as roof downspouts, ground water sump pumps, and driveway drains.

Where leaking sewer pipes allow infiltration of ground water into the sewer pipes, soil particles are typically suspended in the ground water and flow into the sewer pipe, leaving voids in the soil where such suspended soil particles originated. When voids are left on the outside of the pipe, the surrounding soil no longer supports the sewer pipe, which may sag or move. This aggravates the existing defects and creates additional defects.

Once storm and ground water enters the sanitary sewer system, it must be moved and treated in the same manner as sewage thus increasing treatment costs and depleting the hydraulic capacity of the sewer system. Additionally, where excessive amounts of storm or ground water enter the sanitary sewer system, sewage may back up into residents' homes or overflow into waterways creating a health hazard and requiring expensive cleanup measures. Moreover, where defects are left unrepaired, large voids may be created causing potholes, sinkholes, or the total collapse of streets or other constructions located above such sewer pipes.

Alleviation of the adverse effects of infiltration and inflow currently consists of detecting the source of the infiltration and/or inflow by traveling to manholes and residences and visually inspecting the connections or manually sending cameras through the sewers and subsequently repairing the defect(s).

Conventional pipe inspection involves the use a camera, either mounted on a semi-rigid pushrod and pushed into a piping system or transported via a robot crawler. In this manner, an operator is able to visually inspect a pipe for leaks. In either instance, the range of the camera is physically limited by, for example, the length of the pushrod, the length robot's cables, etc. Also, inspection occurs only after someone first identifies a potential problem. For example, if a leak is suspected, one or more flow meters may be positioned in the piping system to detect excessive flow. But if the infiltration or inflow only occurs during periods of high volume (e.g., immediately following a storm), the window for effective inspection may have already passed by the time the flow meters are installed.

SUMMARY

Aspects of the present invention overcome one or more deficiencies of conventional practices related to tracking, inspecting, detecting defects, and repairing defects in pipe networks. In addition, aspects of the invention advantageously provide for remote tracking and remote video inspection of pipe networks.

Aspects of the invention permit visual information to be obtained wirelessly, without the physical limitations of conventional camera inspection systems. One or more cameras may be permanently or semi-permanently installed in a pipe network for monitoring its pipes to properly maintain the pipe network and thereby prevent the development of defects.

This summary is provided to introduce a selection of concepts in a simplified form that are further described below in the Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DESCRIPTION

Embodiments of the present invention provide remote inspection for monitoring pipe systems or networks. According to aspects of the invention, defects in the pipe network, such as those causing infiltration and inflow, are detected. Additionally, embodiments of the present invention provide a method for repairing detected defects. Embodiments of the present invention also track junctions (e.g., where two or more pipes are connected) in pipe networks for efficiently locating and/or mapping pipes in a pipe network. Although aspects of the invention are discussed in connection with a sewer pipe system/network, aspects of the invention may be used in connection with any type pipe system/network.

Figure 1:
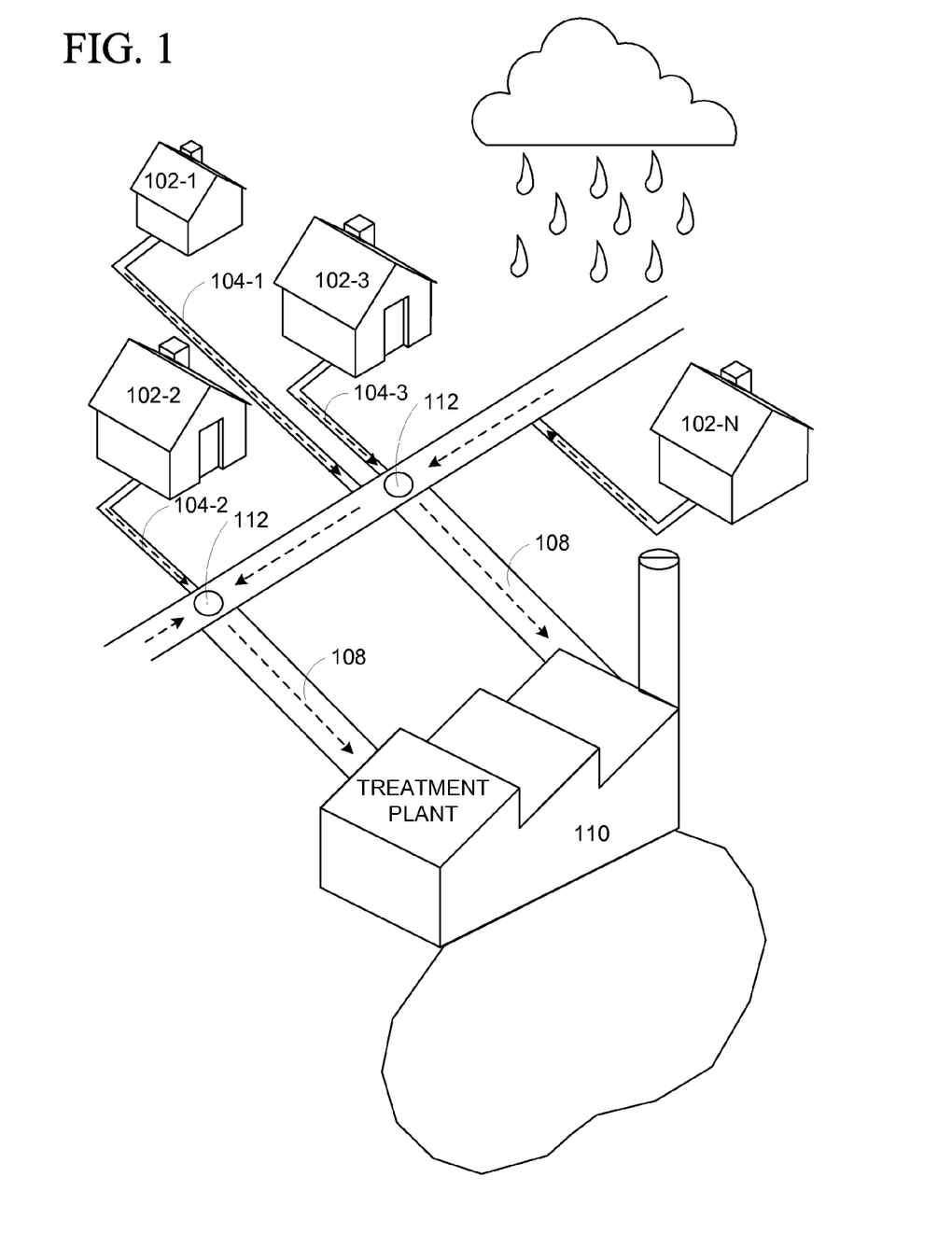
FIG. 1 is a diagram of an exemplary pipe network.

FIG. 1 illustrates an exemplary sewer system (pipe network) 100 during a precipitation event. As illustrated, each home or building 102 is connected through a first underground pipe (e.g., sewer lateral pipe) 104 to a second underground pipe (e.g., sewer main) 106. The main pipe 106 connects into a third underground pipe(s) 108 leading to a treatment plant 110. One or more vertical pipes are also connected to the main pipe 106. The vertical pipes extend from the main pipe 106 underground to the ground surface providing access (e.g., manhole) to the underground pipe network 100 from the ground surface. At the surface, the vertical pipes are covered with removable covers (e.g., manhole covers) 112. During a precipitation event, water produced via the precipitation often enters the sewer system 100. Infiltration occurs when groundwater enters the pipe network (e.g., through leaks in one or more of the pipes 104, 106, 108 or through the manhole). Inflow occurs when storm water is directed to the pipe network through connections such as roof downspouts, groundwater sump pumps, and street or driveway drains. As discussed above, several adverse effects are caused by infiltration, inflow, and/or other consequences of defects in the pipe network 100 (e.g., increasing treatment costs, damage caused by backups, damage to pipes and surface above pipes caused by pipe collapses).

Figure 2:
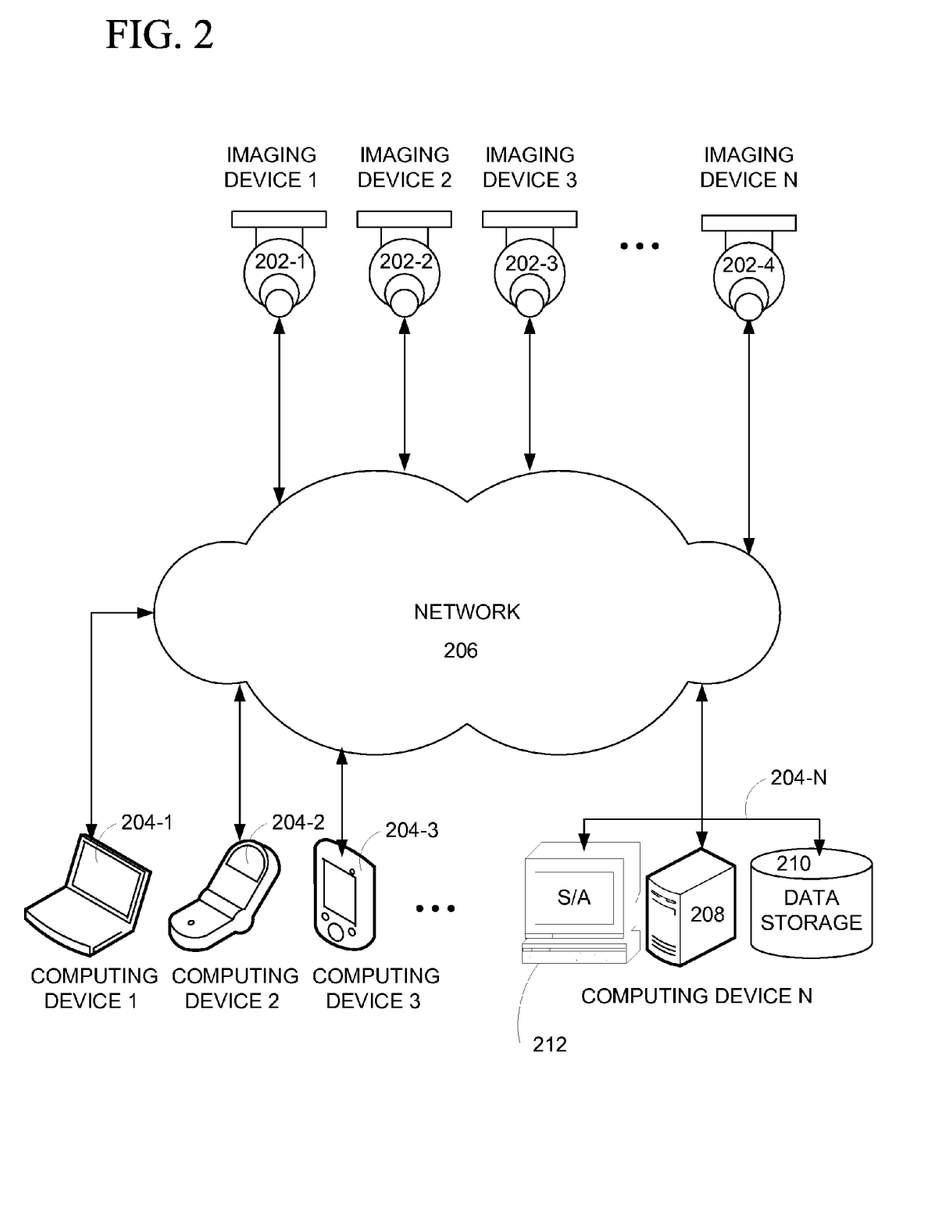
FIG. 2 is a block diagram illustrating a system for remotely inspecting pipes according to an embodiment of the invention.

Referring to FIG. 2, a block diagram illustrates a system 200 for remotely inspecting pipes to detect and/or prevent defects in the pipes. In general, the system 200 includes an imaging device 202 and a remote computing device 204. The imaging device 202 captures a plurality of images (e.g., video) of at least a portion of an interior surface of a pipe and wirelessly transmits data, including image signals representative of the captured images, to the remote computing device 204. The images signals are received by the remote computing device and can be used by the remote computing device (e.g., executing a software program) or a user of the remote computing device (e.g., visually inspecting images) to monitor and/or detect defects in the pipe. Although illustrated as including a plurality of imaging devices 202 and a plurality of remote computing devices 204, it is to be understood that one or more imaging device(s) 202 and remote computing device (s) 204 may be included in the system 200. For example, a single imaging device 202 may be used to generate a video of a portion of an interior surface of a pipe and wirelessly transmit the video to a remote computing device 204. In another example, a plurality of imaging devices 202 may be used to inspect a pipe system (e.g., in a municipality) at a number of locations. Each of the plurality of imaging devices 202 generates a video of a portion of an interior surface of a pipe in the pipe system and wirelessly transmits the video to a remote computing device 204.

According to aspects of the invention, the imaging device 202 has a physical location proximate to an interior surface of a pipe and the computing device 204 has a physical location remote from the location of the imaging device 202. While the location of the imaging device 202 and/or the remote computing device 204 may be substantially permanent/fixed, neither the imaging device 202 nor the computing device 204 is limited to any one particular location for any particular period of time. For example, the imaging device 202 may be positioned in a first pipe for a period of time in order to monitor the interior of first pipe. Subsequently the imaging device 202 may be removed from the first pipe and positioned in a second pipe for a period for time in order to monitor the interior of the second pipe. Similarly, the computing device 204 may be portable. In one example, the computing device 204 (and/or a monitor for viewing captured video images) is mounted in a vehicle for collecting information from numerous locations.

Still referring to FIG. 2, the imaging device 202 and the computing device 204 are coupled to a data communication network 206 such that the imaging device 202 and the computing device 204 can communicate with each other from their respective remote locations. According to embodiments of the invention, the imaging device 202 and the computing device 204 are connected to the data communication network 206 via a wired (e.g., wired network or direct-wired connection) and/or a wireless (e.g., acoustic, radio frequency (RF), infrared) communication media. The data communication network 206 may include a local area network (LAN), a wide area network (WAN), metropolitan/municipal area network (MAN), and/or other area networks known in the art. In the embodiment illustrated, the plurality of imaging devices 202 and the plurality of computing devices 204 are coupled to the data communication network 2306 such that each imaging device 202 can communicate with each computing device 204. Additionally or alternatively, each imaging device (e.g., 202-1) can communicate with each other imaging device (e.g., 202-2, 202-3 . . . 202-N and/or each computing device (e.g., 204-1) can communicate with each other computing device (e.g., 204-2, 204-3 . . . 204-N).

According to embodiments of the invention, the remote computing device 204 receives data (e.g., images of an interior portion of a sewer pipe) via the data communication network 306 transmitted from the imaging device 202. In one embodiment, the remote computing device 204 also transmits data via the data communication network 306 to the imaging device. Exemplary remote computing devices 204 include one or a combination of the following: a personal computer (PC), a workstation, a cellular phone, a portable digital device, a personal digital assistance (PDA), a pocket PC, a digital media player, and any other digital devices known in the art for remotely receiving data via the data communication network 206. As generally known to those skilled in the art, the remote computing devices 204 include a combination of the following: a processing unit 208, a storage memory 210, an Input/Output device(s) 212, a networking device, other devices, and an internal bus system coupling to these components for connecting these components within the computing device 204. The networking device allows the computing device 204 to communicate with the imaging device 202 via the data communication network 206. The networking device may include one or more of the following: a network interface or adapter, a server, a router, a modem and/or other elements for establishing communications over the data communication network 206.

In one embodiment, the computing device 204 includes a storage media for recording the data received via the data communication network from the imaging device 202. The storage media may be included internally or externally in the storage memory (e.g., 310) of the computing device (e.g., 204-1). Alternatively, the storage media may be included internally or externally in a storage memory (e.g., 210) of another computing device (e.g., 204-1) coupled to the computing device (e.g., 204-2). Exemplary internal storage media include RAM, ROM, EEPROM, flash memory and/or other internal storage media known in the art. Exemplary external storage media include memory sticks, CD-ROM, digital versatile disks (DVD), magnetic cassettes, magnetic tape, magnetic disks and/or other storage media known in the art. According to one embodiment, the computing device 204 records to the storage media the data from the imaging device 202 at the time or a short time after it is received via the data communication network so that the data can be conveniently inspected after the time it is recorded. The recorded data may also be compared and evaluated in order to establish trends, diagnose and troubleshoot problems, and develop improvements related to the received data.

The computing device 204 may include one or more output devices for providing to a user (e.g., operator) the data received from the imaging device 202 via the data communication network. For example, the output device includes a display and a video adapter for relaying to an operator the data including images representative of the images generated by the imaging device 202. Exemplary displays include a liquid crystal display (LCD), a cathode tube ray (CRT), a plasma display, a video projector, and the like. In another example, the output device includes a printer for printing the data received. In yet another example, the output device includes speakers for aurally relaying the data to the operator.

Figure 3:
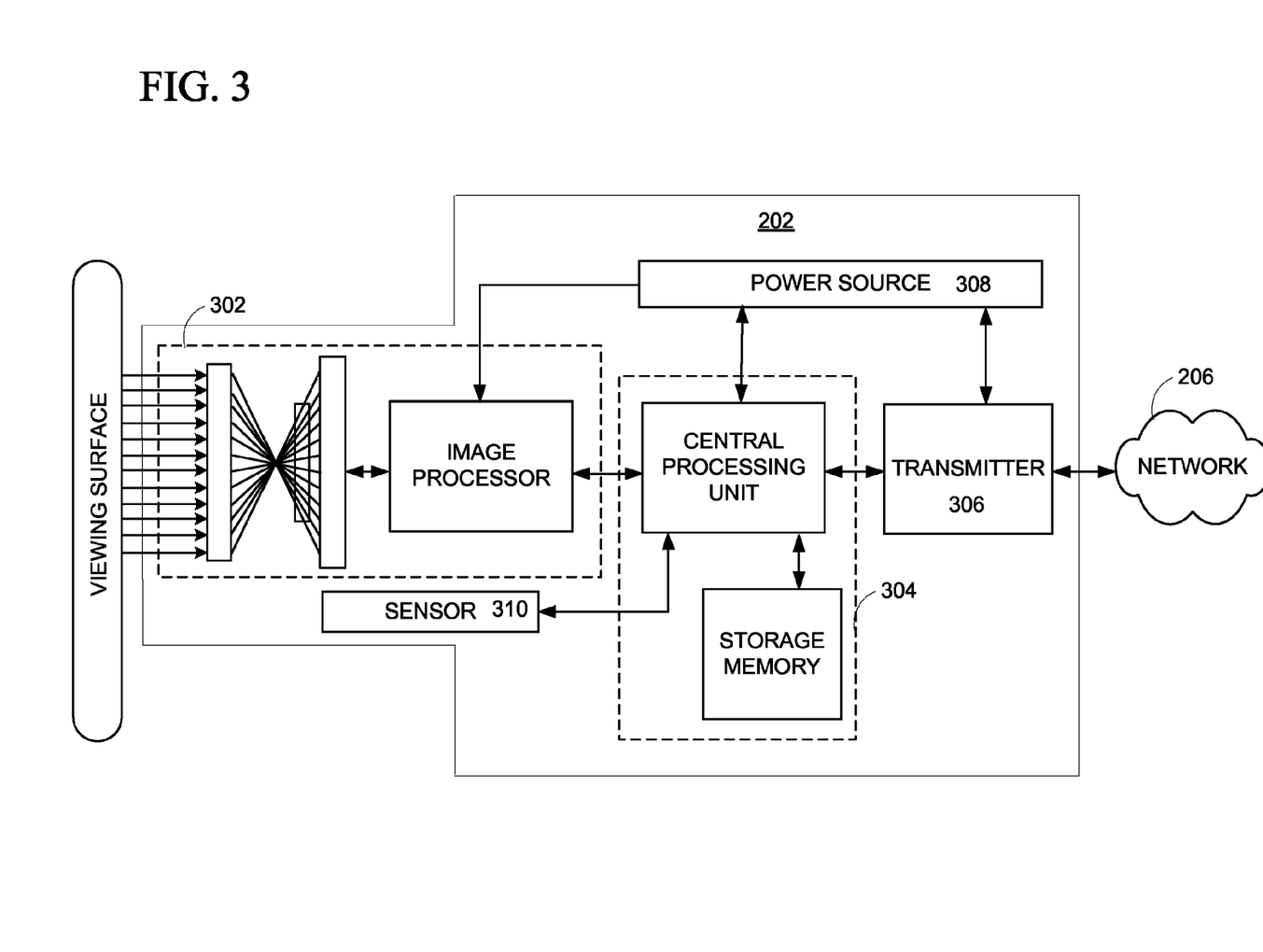
FIG. 3 is a block diagram illustrating an apparatus for remotely inspecting pipes according to an embodiment of the invention.

In an embodiment illustrated in FIG. 3, the imaging device 202 includes a camera 302, a processor 304, and a transmitter 306. The camera 302 includes an image sensing device 308 (e.g., device comprising a lens, a motor, and a light sensor) for generating a plurality of images of a viewing surface (e.g., a portion of an interior surface of a pipe or manhole). The camera 302 also includes an image processor 310 for generating signals representative of the generated images. Exemplary cameras include the following: Intensified Silicon-Intensifier Target tube cameras, Silicon-Intensifier Target Tube cameras, intensified charge coupled device cameras, radiodection cameras, and ultrasonic cameras. Suitable cameras are available from Radiodection Ltd., Envirosight, LLC., and Imaging Products Group, Inc. The processor 304 (e.g., a central processing unit and a storage unit) collects the generated signals and processes the data which includes the collected signals. The transmitter 306 communicates the processed data over the data communication network to the remote computing device.

In one embodiment, the transmitter 306 includes a receiver for receiving requests from the remote device via the data communication network 206. In the embodiment, the processor 304 includes a server for responding to the requests received by the receiver. For example, the remote computing device 204 sends signals including one or more commands/requests to the server via the receiver and the data communication network 206. In one example, the remote computing device 204 sends a command/request to transmit signals representative of images generated by the camera 302. In another example, the remote computing device 204 sends a command/request to transmit data processed by the processor 304.

In one embodiment, the transmitter 306 includes a plurality of network devices for transmitting/receiving the signals via the data communication network. For example, the transmitter 306 may include a network interface (e.g., network interface card, network adapter, etc.,) for enabling the imaging device 202 to transmit and/or receive signals on the data communication network, a forwarding device (e.g., a bridge, a hub, a switch, a repeater, a router) for forwarding/copying the signals on the data communication network, and a router for routing the signals to/from the remote computing device via the data communication network.

In the embodiment illustrated by FIG. 3, the imaging device 202 includes a sensor 310 for sensing a physical characteristic of the pipe. Exemplary sensors 310 include: a thermocouple for measuring a temperature within the pipe, a flow meter for measuring an air or a water flow within the pipe, a light sensor for measuring a light intensity present in the interior of the pipe, a distance sensor for measuring distances between objects located in the pipe and interior surfaces of the pipe, a rain sensor for detecting a presence of rainfall in an atmosphere adjacent the exterior surface of the pipe, a water sensing device for detecting transpiration and evaporation in an atmosphere adjacent the exterior surface of the pipe, and a pressure gauge for measuring a pressure inside the pipe, and other sensors generally known in the art.

In one embodiment, the sensor 310 is connected to the processor 304 such that the processor 304 is responsive to the physical characteristic sensed by the sensor 310. For example, the sensor 310 is a rain sensor. When the rain sensor detects the presence of rainfall in the atmosphere surrounding the imaging device 202, the rain sensor sends a first signal indicating the rainfall to the processor 304. A suitable rain sensor is the RSD Series Rain Sensor available from Rain Bird Corporation, Inc. The processor 304 may be configured to initiate a timer responsive to receiving the first signal. When the rain sensor no longer detects the presence of rainfall in the atmosphere, the rain sensor sends a second signal to the processor 304 indicating the rain sensor no longer detects the presence of rain. The processor 304 then determines and records the time that has elapsed since the processor 304 received the first signal and initiated the timer. The rain sensor may also send a third signal to the processor 304 indicating the total amount (e.g., inches) of rainfall detected by the sensor since the sensor sent the first signal. The processor 304 records the total amount of rainfall detected by the rain sensor. In an embodiment, the processor 304 transmits the recorded data to the remote computing device in response to a command/request from the remote computing device. Advantageously, the processor's 304 response to the sensor 310 (e.g., recording the length and amount of rainfall) can be used to establish trends related to the pipes ability to process rainwater.

Additionally or alternatively, the imaging device 202 may be configured to receive data indicative of weather conditions and generate the plurality of images based on the weather conditions. For example, the imaging device 202 may incorporate or be used in conjunction with a device that obtains data collected by a weather station (e.g., Rain Bird® ET Manager™. According to the example, the imaging device 202 is configured to turn the camera 302 on only when the received data indicates a precipitation event.

In the embodiment illustrated by FIG. 3, the imaging device 202 further includes a power source (e.g., a battery) 308. For example, the power source 308 may be a lithium battery (e.g., Energizer® $e^2$® Lithium® Photo Battery). According to aspects of the invention, the power source 308 selectively supplies power. In one embodiment, the power source 308 is a water activated battery. In another embodiment, the power source 308 is responsive to the physical characteristic sensed by the sensor 310. For example, the sensor 310 is a rain sensor and the rain sensor sends a signal to the power source 308 upon detecting rain. Upon receiving the signal, the power source 308 may then provide power to the camera 302, processor 304, and/or transmitter 306. Advantageously, the power source 308 is able to conserve power by supplying power only when necessary (e.g., to obtain images of the pipes during rainfall). In yet another embodiment, the power source 308 is responsive to the processor 304. Upon receiving a signal from the processor 304 (which receives a signal from the remote computing device via the data communication network), the processor 304 may then provide power to the camera 302, sensor 310, and/or other devices of the imaging device 202 utilizing the power supply. Additionally, generating images exclusively during events (e.g., rainfall) when such images are of interest eliminates the need to sort through the images to find such images of interest.

In another embodiment, the imaging device 202 further includes an output device 212 for altering one or more physical conditions in the interior of the pipe. Exemplary output devices 212 include a light source for improving the visibility in captured images, a motor for adjusting the location and orientation of the camera 302 or portions thereof, a fan, another sensor 310, and/or other output devices known in the art. In an embodiment, the output device 212 is responsive to the physical characteristic sensed by the sensor 310. For example, the sensor 310 is a light sensor and the output device 212 is a light. When the light sensor senses darkness, the light is illuminated. The output device 212 may be responsive to signals received directly from the sensor 310 or indirectly via the processor 304. In another embodiment, the output device 212 is responsive to commands/requests from the remote computing device 204 received by the output device 212 via the processor 304. For example, the remote computing device 204 may send a command/request to the processor 304 (via the receiver and the data communication network) for adjusting the zoom of the camera 302. The processor 304 processes the request and sends the processed request to the motor associated with the camera 302. The motor adjusts the zoom of the camera 302 based on processed request received from the processor 304.

The imaging device 202 may also include a housing unit. According to aspects of the invention, the housing unit prevents water from damaging the components (e.g., the camera, processor, transmitter, sensor, power source, etc.) enclosed by the housing. For example, the housing unit may be a plastic, water tight case which prevents the enclosed components from being exposed to moisture, water, debris, extreme temperatures, and other damaging conditions.

Figure 4A:
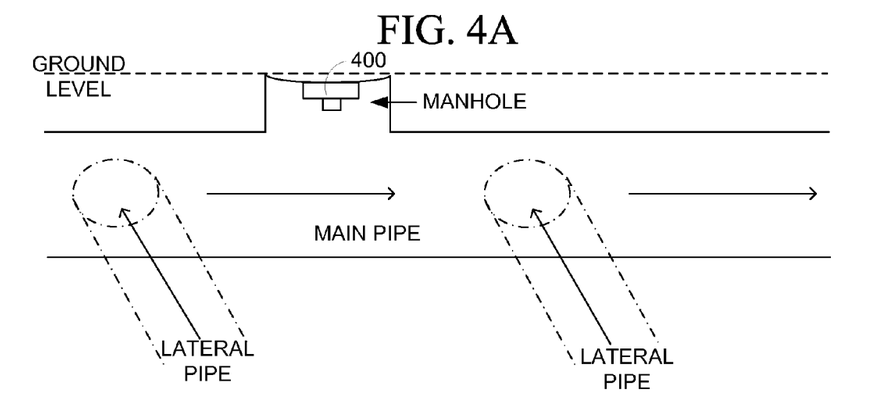
FIGS. 4A, 4B, and 4C are diagrams illustrating arrangements in a pipe system for apparatuses inspecting the pipe system according to an embodiment of the invention.
Figure 4B:
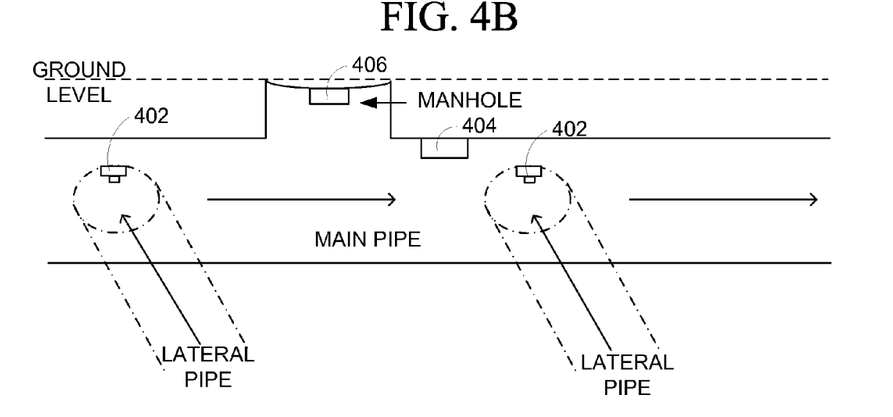
Figure 4C:
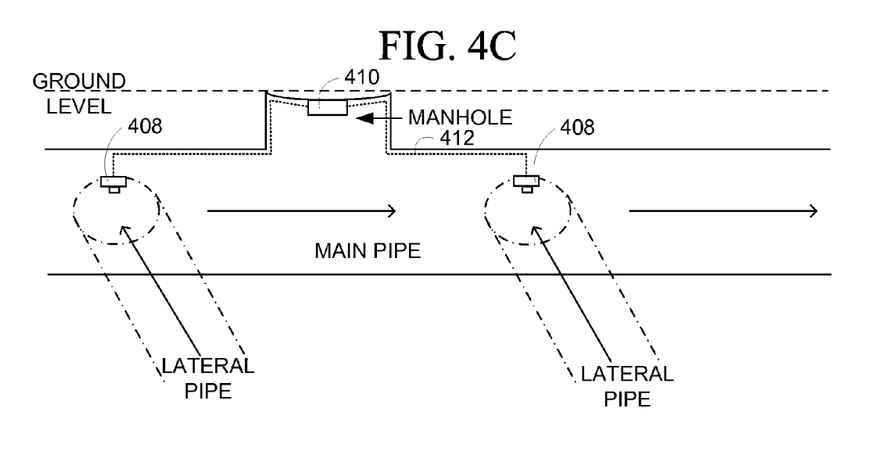

FIGS. 4A, 4B, and 4C various configurations for locating the imaging device 202 with respect to a pipe. In the embodiment illustrated by FIG. 4A, the imaging device 202 includes a housing unit 400 for housing the camera 302, the processor 304, and the transmitter 306. The housing unit 400 is adapted to be mounted to a surface (e.g., a manhole) such that the imaging device 202 is situated to generate images of the interior portion of the pipe and the transmitter 306 is able to wirelessly transmit signals via the data communication network 206.

In the embodiments illustrated by FIGS. 4B and 4C, the imaging device 202 includes a plurality of housing units 402, 404, 406, each housing components of the imaging device 202. In the embodiment illustrated by FIG. 4B, the imaging device 202 includes three separate housing units. The first housing unit 402 includes the camera 302 and a first transmitting component (e.g., network interface card/adapter). The second housing unit 404 includes a second transmitting component (e.g., a switch). The third housing unit 406 includes the processor 304 and a third transmitting component (e.g., a router). According to aspects of the illustrated embodiment, the first housing unit 402 is mounted such that the camera 302 generates images of the interior portion of a pipe. For example, the first housing unit 402 may be mounted at a wye or a tee connection of a pipe system, a manhole, a cleanout, or any other entry or exit location of a pipe system. The camera 302 generates signals representative of the generated images and the first transmitting component wirelessly communicates the signals to the second transmitting component. The second transmitting component wirelessly communicates the received signals representative of the generated images to the processor 304 situated in the third housing unit 406. The processor 304 collects the received signals and processes data included in the signals. The third housing unit 406 is mounted such that the transmitting component (e.g., the router) can then wirelessly communicate the processed signal to the remote computing device 204 via the data communication network 206. Alternatively, the transmitting component (e.g., the router) may be housed in a fourth housing unit (not shown) which is mounted outside the pipe system (e.g., on an exterior surface of a manhole or nearby structure). In one embodiment, a plurality of imaging devices 202 sharing a transmitting component (e.g., the router) form a network. For example, the third housing unit 406 (e.g., the processor and the router) receives signals from one or more second housing unit(s) 404 (e.g., switch), and the second housing unit(s) 404 receive signals from a plurality of first housing units (e.g., cameras and network interface) 402.

In another embodiment illustrated by FIG. 4C, the imaging device 202 includes a first housing unit 408, a second housing unit 410, and a connector (e.g., a cable) 412 for connecting the components situated in the first housing unit 408 with the components situated in the second housing unit 410. The first housing unit 408 houses the camera 302 and is mounted to a surface (e.g., at or near a wye or a tee connection of a pipe system) such that the imaging device 202 is situated to generate images of the interior portion of a pipe. The second housing unit 410 houses the transmitter 306 and the processor 304 and is mounted to a surface (e.g., at a manhole, cleanout, or any other entry or exit location of a pipe system) such that the transmitter 306 is able to wirelessly transmit signals via the data communication network 206. In an embodiment, a plurality of housing units, each housing a camera 302, are connected to the same second housing unit 410 for processing and transmitting the image signals generated by each of the cameras 302. In one embodiment, one connector (e.g., a bus) 412 is used to connect the plurality of housing units to the second housing unit 410. In another embodiment, a connector 412 is used to connect each of the plurality of housing units to the second housing unit 410. A plurality of housing units and connectors may be used to house and connect the components of imaging device in various combinations without departing from the scope of the invention.

In the embodiments illustrated in FIGS. 4A, 4B, and 4C, the imaging device 202 further includes a means for mounting the housing units to various surfaces. The housing units may be mounted manually or robotically (e.g., via RedZone Robotic Services). In one embodiment, the means for mounting the housing units includes an epoxy (polyepoxide) and a catalyzing agent. The epoxy cures when mixed with the catalyzing agent to adhere the housing units to particular surfaces. The catalyzing agent used to cure the epoxy may be chosen for the mounting location. In one embodiment, the housing units are located in a substantially dark sewer pipe network and the catalyzing agent is light. In an embodiment, the catalyzing agent is ultra-violet light. Advantageously, ultra-violet light provides a relatively fast curing time allowing the housing units to be securely mounted in intervals when conditions facilitate the curing of the epoxy (e.g., periods of no rain, periods of favorable temperatures, etc.).

In an embodiment, the system for remotely inspecting a pipe further includes a means for repairing defects detected in the pipe based on the inspection of the pipe. In one embodiment the means for repairing the defect comprises an epoxy (e.g., resin) and a catalyzing agent (e.g., light). For example, the defect is repaired by lining the pipe having the detected defect with resin-impregnated sleeve and curing the resin using ultra-violet light. As mentioned, ultra-violet light provides a relatively fast curing time. Thus, such a means for repair enables the detected defect to be repaired in intervals when conditions facilitate the curing of the resin (e.g., periods of no rain, periods of favorable temperatures, etc.). In another embodiment, the means for repairing the defect alternatively comprises a reinforced Fiberglass Liner (e.g., LightStream available from International Pipe Lining Technologies).

Aspects of the invention also provide a method for tracking pipe junctions. In one embodiment a plurality detectable objects, a locating device, and a transmitting device are used track pipe junctions. The detectable object is positioned in an underground pipe (e.g., at a pipe junction). The detectable object may be positioned manually or robotically (e.g., via RedZone Robotic Services). The locating device is particularly located above and substantially vertical to the detectable object near or above the surface of the ground. In one embodiment, a detector is used above ground to detect the object and indicate the position for the locating device. The locating device includes a processor for determining position data and a transmitter for relaying the position data of the particular locating device to the remote computing device via the data communication network. The position data includes data identifying the locating device and data indicating the position of the locating device. The remote computing device collects the position data from the one or more locating device(s) for the plurality of detectable objects for tracking the pipe junctions. The collected position data may be used to develop maps of pipe networks. Such maps are useful for designing building plans which do not obstruct or interfere with pipe networks. Additionally, such maps are useful for expanding or otherwise modifying pipe networks.

In one embodiment, the locating device further includes a receiving device for receiving signals and the processor uses the received signals to determine the position of the locating device. For example, the locating device may be a global position system (GPS) receiver. In this example, the GPS receiver receives signals from GPS satellites and determines its location based on the received signals.

In one embodiment, the detectable object is comprised of material which is detectable by a detector from the surface of the ground. In another embodiment, the detectable object includes a processor, a transmitting and receiving component for communicating with the locating device directly or via a network device (e.g., transmitting components of the imaging device). The detectable object may further include one or more sensing devices for obtaining data related to physical conditions of the interior of the pipe. The data is transmitted to the remote computing device via the transmitting component of the detectable object. In one embodiment the detectable object includes a means for mounting the detectable object in a pipe. The detectable object may be mounted on or in the housing unit of the imaging device. Alternatively, the detectable object is mounted directly to an interior surface of a pipe. In one embodiment, the means for mounting the detectable object include epoxy (e.g., resin) and light (e.g., UV light).

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An apparatus for inspecting pipes in a sewer network from a computing device remotely located with respect to said apparatus, said remote computing device being connected to a data communication network, said apparatus comprising:
  a camera for capturing a plurality of images of at least a portion of an interior surface of a pipe in the sewer network and for generating signals representative of the captured images;
  a processor receiving and responsive to the generated signals and configured for communicating with the remote computing device;
  a transmitter associated with the processor for communicating the generated signals representative of the captured images to the remote computing device via the data communication network;
  a first sensor for sensing a physical characteristic external to the pipe, said first sensor comprising one or more of the following: a rain sensor for detecting a presence of rainfall in an atmosphere adjacent an exterior surface of the pipe and a water sensing device for detecting transpiration and evaporation in an atmosphere adjacent an exterior surface of the pipe; and
  a housing for the camera, the processor, and the transmitter, said housing being adapted for mounting on a surface of a manhole adjacent the interior surface of the pipe.

2. The apparatus of claim of claim 1, further comprising a second sensor for sensing a physical characteristic within the pipe, said processor being responsive to the sensed physical characteristic for controlling operation of the apparatus.

3. The apparatus of claim 2, further comprising a power source responsive to the physical characteristic sensed by the second sensor for supplying power to the camera.

4. The apparatus of claim 2, further comprising an output device responsive to the physical characteristic sensed by the second sensor, said output device comprising one or more of the following: a light source, a motor for adjusting the location and orientation of the camera, a fan, and another sensor.

5. The apparatus of claim 2, wherein the second sensor comprises one or more of the following: a thermocouple for measuring a temperature within the pipe, a flow meter for measuring a fluid flow within the pipe, a light sensor for measuring a light intensity present inside the pipe, a distance sensor for measuring distances between objects located in the pipe and the interior surface of the pipe, and a pressure gauge for measuring a pressure inside the pipe.

6. The apparatus of claim 1, wherein the transmitter includes a receiver for receiving requests from the remote computing device, and wherein the processor is responsive to said requests for communicating the generated signals to the remote computing device.

7. The apparatus of claim 1, wherein the processor stores position data indicative of the location of the camera within the sewer network, and wherein the transmitter communicates said position data to the remote computing device.

8. An apparatus for inspecting pipes in a sewer network from a computing device remotely located with respect to said apparatus, said remote computing device being connected to a data communication network, said apparatus comprising:
  a camera for capturing a plurality of images of at least a portion of an interior surface of a pipe in the sewer network and for generating signals representative of the captured images;
  a processor receiving and responsive to the generated signals and configured for communicating with the remote computing device; and
  a transmitter associated with the processor for communicating the generated signals representative of the captured images to the remote computing device via the data communication network;
  a first housing for the camera, said first housing being adapted for mounting within the sewer network adjacent a lateral pipe of the sewer network, wherein the camera generates images of at least a portion an interior surface of the lateral pipe;

a second housing for the transmitter and the processor, said second housing being adapted for mounting on an interior surface of a manhole; and wherein the camera of the first housing and the processor of the second housing are operably connected.

9. The apparatus of claim 8, wherein the camera is fixedly attached to the interior surface of the pipe and located remotely from the transmitter.

10. A system for inspecting pipes comprising:
- an imaging device for capturing a plurality of images of at least a portion of an interior of a pipe, said imaging device being connected to a data communication network and transmitting data over the data communication network, said data including image signals representative of the captured images, said imaging device including a camera fixedly attached to an interior surface of the pipe;
- a computing device connected to the data communication network for receiving data transmitted over the data communication network by the imaging device, said computing device being remotely located with respect to the imaging device; and
- a first sensor for sensing a physical characteristic external to the pipe, said first sensor comprising one or more of the following: a rain sensor for detecting a presence of rainfall in an atmosphere adjacent an exterior surface of the pipe and a water sensing device for detecting transpiration and evaporation in an atmosphere adjacent an exterior surface of the pipe.

11. The system of claim 10, wherein the computing device includes a monitor for displaying the image signals included in the data transmitted by the imaging device as images representative of the captured images.

12. The system of claim 10, wherein the image signals comprise video signals.

13. The system of claim 10, wherein the imaging device includes a second sensor for sensing a physical characteristic of the pipe, and wherein the data transmitted by the imaging device and received by the computing device includes data representative of said sensed physical characteristic.

14. The system of claim 10 wherein the computing device includes a transmitting component for transmitting data via the data communication network to the imaging device, and wherein the imaging device includes a receiving component for receiving the data transmitted via the data communication network by the transmitting component and a processing component for responding to said received data.

15. The system of claim 10, further comprising:
- a detectable object positioned in the interior of the pipe, said pipe being located below ground; and
- a locating device for transmitting position data to the remote computing device, said locating device being positioned above ground and substantially vertically with respect to the position of the detectable object, wherein said position data identifies said locating device and indicates the position of said locating device.

16. The system of claim 15, wherein the locating device includes a global position system (GPS) receiver, and wherein said locating device determines the position data based on global positioning signals received by the GPS receiver.

* * * * *